Patented Feb. 27, 1940

2,191,473

UNITED STATES PATENT OFFICE 2,191,473

WELDING COMPOSITION

Harry S. Blumberg, New York, N. Y., assignor to The M. W. Kellogg Co., New York, N. Y., a corporation of Delaware No Drawing. Application August 13, 1937, Serial No. 158,870

5 Claims. (Cl. 148—26)

This invention relates in general to welding compositions and in particular to welding compositions of the character employed in electric welding in which the welding heat is generated by the passage of welding current through a gap between the end of a welding electrode and the work.

The development of covered welding electrodes enabled the electric seam welding art to attain a comparatively high degree of perfection as with such electrodes the deposition of superior weld metal and the production of welds that satisfied the most rigorous standard became a comparatively simple matter. With this development successfully completed the art bent its efforts to the reducing of the cost of the welding operations. At first it was attempted to use covered electrodes in continuous and automatic operations. These attempts did not prove entirely successful because of the difficulties involved in passing the welding current uninterruptedly to the metallic core of the covered welding electrodes.

An electric seam welding process was later proposed which has all of the simplicity of bare electrode welding and all the advantages of covered electrode welding. The proposed process includes filling the welding groove to overflowing with a powdered welding composition or flux and discharging the welding current from the end of a bare electrode submerged in the flux so that the entire operation is completely shielded from the atmosphere by the flux blanket. As a bare electrode is used the proposed operation may easily and simply be made continuous and automatic. Also, this proposed operation has the outstanding advantage that greater current densities may be used and greater weights of weld metal deposited for each traverse of the welding electrode than heretofore.

The proposed method while successful in some of its applications presents many problems most of which result from the fluxes used. In making use of the proposed process the art naturally attempted to use the fluxes which had proven successful in the prior methods and particularly in the covered electrode methods. The results were, however, generally unsatisfactory for while covered electrode welding requires a flux coating capable of evolving protective volumes of gases at the arc the proposed method requires a flux having a minimum of gas evolving tendencies. Fluxes for the proposed method, which were successful for specific welding problems have from time to time been developed but no satisfactory general class of fluxes was proposed until quite recently.

The recently proposed fluxes are of substantially non-gassing character and can generally be used with more or less success in the proposed and similar methods. These fluxes are made up essentially of silicates which may be either simple or complex. The proponents of these fluxes set up as the essential of a suitable flux that the reactions between the components thereof must be completed before it is used for welding. To obtain such a flux the proponents require that the ingredients in the stoichiometric proportions necessary to form definite meta or acid silicates, be prefused in an electric furnace until the reactions between the ingredients are completed. The proponents also state that the physical condition of the flux is of utmost importance. In order to produce the flux in the condition they require the proponents state that it must be rapidly cooled from the molten condition so that all of it will display a characteristic vitreous fracture.

These requirements seriously effect the cost of the proposed fluxes and furthermore are, with the exception of the non-gassing requirement, quite unnecessary.

Through a long series of experiments with the proposed method in welding carbon steels and alloy steels I have found that the satisfactory fluxes are those that besides being substantially non-gassing have a minimum tendency of oxidizing or promoting the oxidation of the constituents of the metal of the work as well as the constituents of the resulting deposited metal. Since in welding both the metal of the work and the metal of the electrode, or other source of weld metal, are in a highly refined condition and also since the work is generally carefully prepared either by machining, sand blasting and the like, to remove oxides, scale and other extraneous materials there is no need to employ a flux that has a very high degree of chemical activity.

It is an object of this invention to provide a welding composition or flux which is substantially non-gassing when subjected to welding conditions and which under such conditions has a low order of chemical activity with regard to the required constituents of the metal it comes in contact with.

It is also an object of this invention to provide a welding composition or flux which can be used successfully in welding operations of the type in which the welding heat is generated by the passage of welding current from the end of the welding electrode to the work beneath a protective blanket of flux; which welding composition is substantially non-gassing and will not react harmfully to any substantial degree with the constituents of the heated metal or promote deleterious reactions with the constituents of the heated metal.

It is a further object of this invention to provide a welding composition that is characterized by its low gas producing and reacting tendencies under welding conditions and its ability to self disintegrate into a fine particle size powder on cooling from fusing temperatures.

The above and the further objects and advantages of the invention will be apparent from the following description of preferred welding compositions embodying the invention.

The novel welding composition is of general utility in electric welding and may be used with success in place of many of the mineral fluxes, also it may be used in the compounding of covering material for covered welding electrodes. The novel welding composition is, however, especially adapted for use in the submerged welding operations.

In carrying out submerged welding operations a powdered welding composition or flux is placed in the welding groove, or on the surface of the work in such quantity that during the subsequent welding, the welding current discharge occurs at a substantial distance below the surface of the flux blanket so that the welding current discharge, the discharge end of the welding electrode, the surface of the work, the molten metal and the cooling metal are protected from the atmosphere by the flux.

The metal employed in welding operations, whether it is the metal of the work, or the metal of the welding electrode, or metal deposited from a source other than the welding electrode, is always in the highly refined state and contains a minimum of impurities and extraneous matter that can have a debasing effect on the character of the weld metal. In accordance with the usual practice further care is taken that surface materials such as scale, and the like, are removed from the zone of the weld, as by sand blasting, machining to form the welding groove etc., prior to the carrying on of the welding operations. Thus, in the submerged welding operations the real problems are to prevent the evolution of substantial quantities of gas which will render the weld metal porous and to prevent the weld metal as it is deposited and cooled from being acted upon by the oxygen and nitrogen of the atmosphere.

The novel flux composition of the invention is characterized by the fact that it is free from substances which have the tendency to produce substantial volumes of gas under welding conditions; that it is free from substances which oxidize, cause oxidation, or promote oxidation of the constituents of the metal welded while in the conditions of fusing metal, molten metal or cooling metal; that it is in such physical and chemical condition that it protects the welding operation from the atmosphere to the utmost degree; that it is of such composition that it possesses the physical, chemical and electrical properties necessary to stabilize the welding operation and also to give satisfactory penetration. Furthermore, the welding composition is cheap, it may be reused, and it may be easily prepared from readily available materials.

The novel welding composition is essentially a flux system made up of calcium (alone, or in mixture with other alkaline earth metals), silicon and oxygen in such proportions that when molten there is present a predominating amount of calcium ortho-silicates, of which the di-calcium silicate comprises the major proportion, some free alkaline earth metal oxide or oxides, some ternary compounds of the alkaline earth metal oxides with silica, a small amount of meta-silicates and a smaller amount of free silica. When the welding composition is made up of calcium, silicon and oxygen, these elements will be present in the stoichiometric proportions, or the approximate stoichiometric proportions, required to form di-calcium silicate.

The presence of substantial proportions of di-calcium silicate renders the welding composition self-disintegrating, that is, the welding composition upon cooling after being fused or highly heated will disintegrate by itself into a fine powder. This property of the welding composition is due to the fact that the di-calcium silicate undergoes a change in crystalline form upon cooling which is accompanied by an increase in volume. The self-disintegrating characteristic is an important one as it materially reduces the cost of the welding composition since grinding either before the first use or before reuse is thus eliminated.

While the invention contemplates welding compositions of the character just mentioned, made up substantially entirely of calcium, silicon and oxygen, in the form of calcium ortho-silicates when fused, it is not limited thereto and contemplates also welding compositions of a more complex character. Thus, the basic component of the welding composition need not be all CaO but may be a mixture of CaO and MgO so that the welding composition when fused, will be a mixture of calcium ortho-silicates, the ternary calcium magnesium silicates and di-magnesium silicate. Usually there will be from 4 to 12 times as much CaO as MgO in such a welding composition.

The flux composition may also include elements such as aluminum, titanium, fluorine and the like which are present in the fused welding composition respectively as calcium aluminate, calcium magnesium aluminate, calcium titanate, and complex silico-fluorides; these elements are reported in analysis respectively as $Al_2O_3$, $TiO_2$ and $CaF_2$ and may occur in the following percentages: $Al_2O_3$, from a trace to 10%; $TiO_2$, from a trace to 10%; $CaF_2$, from a trace to 5%. These substances are included for the purpose of thinning the welding composition and/or to render the welding operation more stable. Of these substances $Al_2O_3$ and $TiO_2$ while amphoteric exhibit an acid character in these welding compositions and consequently when they are used either the silica content must be reduced or the CaO and/or MgO content increased to substantially maintain the proportions above given in connection with the simple Ca-Si-O system.

As the flux system is made more complex the problem of producing a proper welding composition is greatly complicated especially so since our knowledge of the more complex silicates and fluxes is more or less empirical. However, I find from experiment that a welding composition will be satisfactory if, aside from being in the properly refined condition, it includes when fused, such a proportion of $2CaO.SiO_2$ that it is self-disintegrating and such a proportion of $SiO_2$ and other acid constituents such as $TiO_2$, $Al_2O_3$, etc.; that it is substantially an eutectic composition.

This fact is very important as by the addition of silica, or others of the acid ingredients mentioned above, to adjust the melting point I have converted materials which were in some cases entirely unsatisfactory into very satisfactory welding compositions.

In many of the more complex silicate systems with four or more components, there are usually two or more eutectic points close together in the region of the meta silicate compositions, resulting in a large range of compositions, all of which have a low melting point and are substantially eutectic compositions. Therefore, it is to be understood that by substantially eutectic compositions I intend the compositions at or near the single or plural eutectic points of the particular system.

The welding compositions may also include from a trace to 2% of calcium carbide. The inclusion of this material is desirable as it renders the welding composition definitely reducing under welding conditions. A welding composition having more or less pronounced reducing properties is desirable when welding some of the steels and alloys as practically nearly all the constituents of steels and alloys are very much subject to oxidation with sometimes serious effects on the resulting welding metal.

The addition of $CaC_2$ also affects the welding characteristics of the welding composition; thus, when $CaC_2$ is present in from 0.5% to 2.0%, the $SiO_2$, and/or other acid component, content need not be quite as high as in similar welding compositions that do not include $CaC_2$, i. e., it need not approach the proportion required for an eutectic or approximately eutectic mixture quite as closely. While I cannot fully explain the reason for this I have found that a $CaC_2$ content in the range above given, will be equivalent to as much as 4% additional $SiO_2$ in the welding mixture.

As is evident to those skilled in the art a large number of welding compositions of different analysis are possible with the variations in the auxiliary components set forth above and as stated above, these variations will all require an adjustment in the CaO and $SiO_2$ content in order to produce the desirable results of the welding compositions of this invention. While the CaO and $SiO_2$ content of each welding composition must be determined by itself I find that as a general rule the CaO content of the welding composition will vary from 40% to 70% and the $SiO_2$ content will vary from 20% to 40%.

I have found that the various reactions involved in the formation of the di-calcium silicate, and the other compounds mentioned above, as present in the fused welding compositions, take place without substantial gas formation.

I have also found that in the fluxing reactions no more gas is evolved when the components of the di-calcium silicate and the other compounds mentioned above, are used than when the compounds themselves as such are used. Thus, the welding compositions may be compounded from materials that contain the required compounds as such or from materials which when fused in the actual welding operation will produce the required compounds. It is to be noted, however, that since these welding compositions can be used over and over again, the welding composition when ready for reuse will contain di-calcium silicate and other compounds mentioned as such. At present, I prefer to compound the novel welding composition by employing as the main raw material a material that includes the proper proportion of di-calcium silicate and adding the remainder of the components to this material to form welding composition of required analysis.

If a cheap material containing the required proportion of di-calcium silicate is not readily available it may easily be produced by fusing CaO and $SiO_2$ together in the proper proportions.

The successful operation of the novel welding composition as a protective blanket depends on its chemical composition and on its freedom from substances which liberate or promote the liberation of deleterious gas during the welding process. Welding fluxes will produce deleterious gas during welding if they contain organic material or certain inorganic material such as water, peroxides, unstable oxides, carbonates, bicarbonates and the like. Some of these materials may be expelled from the welding composition by simple drying operations others may be expelled by more drastic heating. Thus, in order to place my novel welding compositions in condition for use I at least dry all of the materials going into them and preferably calcine or even sinter those materials that contain or may contain other gas producing materials besides water. I may, thus, treat the raw materials separately or in mixture or even after the welding composition is compounded.

The novel welding composition is in the powder form and is definitely crystalline. In its preparation, and especially prior to its reuse it is allowed to cool slowly and no attempt is made to solidify it rapidly so as to obtain it in the amorphous condition, in which condition it would evidence a vitreous fracture.

I have used a welding composition of the following analysis with success in submerged welding operations:

| | Per cent |
|---|---|
| CaO | 52.3 |
| $SiO_2$ | 32.0 |
| MgO | 4.7 |
| $Al_2O_3$ | 4.7 |
| $CaF_2$ | 3.7 |
| MnO | 0.3 |
| FeO | 0.3 | with the remainder made up of sulphur, iron oxide, free carbon and such like impurities.

I have also used a welding composition of the following analysis with success in submerged welding operations:

| | Per cent |
|---|---|
| CaO | 51.3 |
| $SiO_2$ | 24.4 |
| $TiO_2$ | 7.8 |
| $ZrO_2$ | 1.2 |
| MgO | 4.6 |
| $Al_2O_3$ | 4.6 |
| $CaF_2$ | 3.7 |
| MnO | .3 |
| FeO | .3 | with the remainder made up of sulphur, iron oxide, free carbon and such like impurities.

The $TiO_2$ content of the above welding compositions was supplied by the addition of a titanium ore having the following analysis:

| | Per cent |
|---|---|
| $TiO_2$ | 78 |
| $ZrO_2$ | 14 |
| $SiO_2$ | 8 |

The zirconium content of the ore, I have found has a further stabilizing influence on the welding operation and is therefore, a very desirable constituent of the welding composition. Zirconium, reported as ZrO$_2$ may be present in the novel welding compositions in percentages ranging from a trace to 5% or more.

I have also used successfully in submerged welding operations a welding composition of the following analysis:

| | Per cent |
|---|---|
| SiO$_2$ | 26.6 |
| CaO | 53.1 |
| Al$_2$O$_3$ | 4.11 |
| MgO | 7.3 |
| CaC$_2$ | 0.8 |
| FeO | 0.8 |
| CaF$_2$ | 4.8 |
| MnO | 0.7 | with the remainder made up of P, S, and other elements.

I claim:

1. A welding composition substantially free of substances capable of producing deleterious gas and vapor under welding conditions, said composition containing in major proportion components of alkaline earth metal silicates, calcium oxide being present in predominant proportion and in quantity sufficient for calcium ortho-silicates, said composition containing in minor proportion calcium carbide.

2. A welding composition substantially free of substances capable of producing deleterious gas and vapor under welding conditions, said composition containing in major proportion components of calcium and magnesium silicates, calcium oxide being present in predominant proportion and in quantity sufficient for calcium ortho-silicates.

3. A welding composition substantially free of substances capable of producing deleterious gas and vapor under welding conditions, said composition consisting in major proportion of components of alkaline earth metal silicates, calcium oxide being present in predominant proportion and in quantity sufficient for calcium ortho-silicates, and in minor proportion of thinning and stabilizing components chosen from the group made up of Al$_2$O$_3$, TiO$_2$, ZrO$_2$ and CaF$_2$.

4. A welding composition in accordance with claim 3 in which the calcium ortho-silicates include a sufficient proportion of di-calcium silicate to render the composition self-disintegrating when cooled after fusion.

5. A welding composition in accordance with claim 3 in which the basic and acid components are so adjusted that said composition is substantially an eutectic mixture.

HARRY S. BLUMBERG.